June 24, 1930.  E. H. McCLOUD  1,766,342
AUTOMOBILE BUMPER
Filed Nov. 9, 1929  2 Sheets-Sheet 1
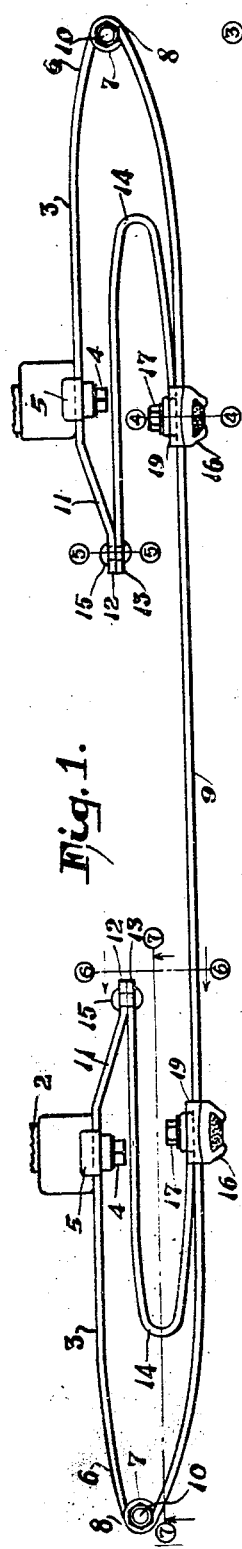
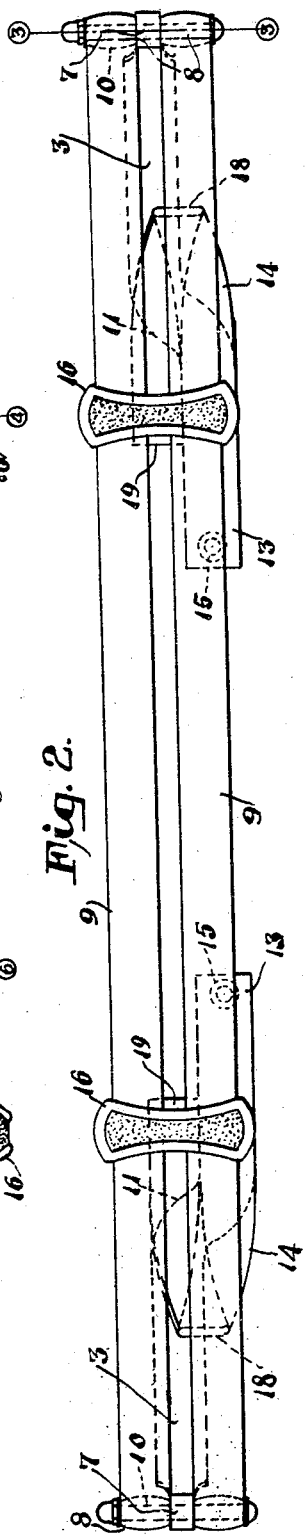
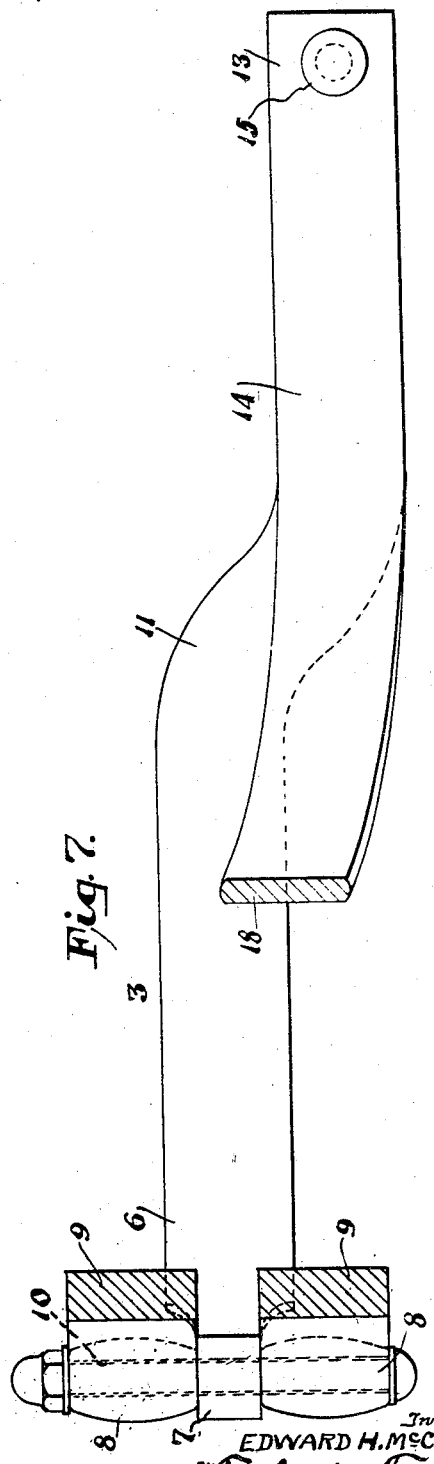
Inventor
EDWARD H. McCLOUD,
by Toulmin & Toulmin
Attorneys June 24, 1930.  E. H. McCLOUD  1,766,342
AUTOMOBILE BUMPER
Filed Nov. 9, 1929  2 Sheets-Sheet 2

EDWARD H. McCLOUD, Inventor

Patented June 24, 1930

1,766,342

UNITED STATES PATENT OFFICE

EDWARD H. McCLOUD, OF COLUMBUS, OHIO

AUTOMOBILE BUMPER

Application filed November 9, 1929. Serial No. 405,931.

My invention relates to automobile bumpers.

It is the object of my invention to provide a bumper so that the impact forces applied to it will be distributed on both sides of the frame ends and will not spread the frame.

It is a further object to distribute the impact forces throughout the entire bumper structure in a substantially uniform manner so that bumper material of uniform section can be employed of minimum weight as certain portions thereof do not have to be made heavier in order to take up unusual strains.

In particular it is an object to provide spaced, independent, concentric impact members connected to the front bumper bars and to the inner ends of the rearwardly disposed spring supporting plates, to the outer ends of which the bumper bars are pivoted.

Referring to the drawings:—

Figure 1 is a top plan view;

Figure 2 is a front elevation;

Figure 7 is a section on the line 7—7 of Figure 1.

Figure 6:
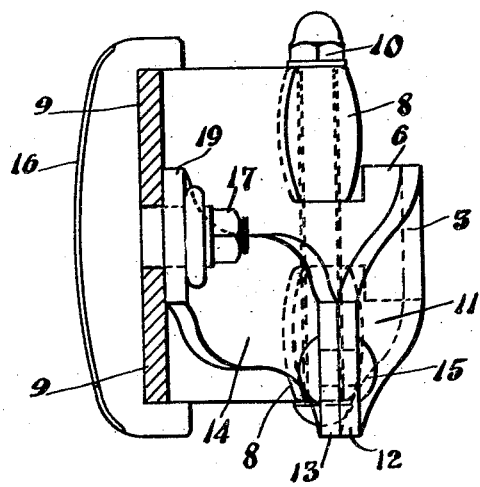
Figure 6 is a section on the line 6—6 of Figure 1 looking in the direction of the arrow.
Figure 4:
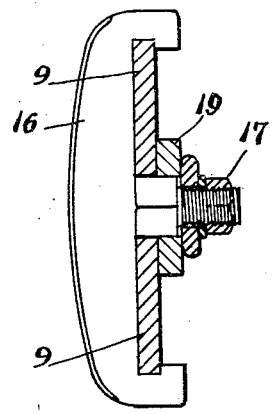
Figure 4 is a section on the line 4—4 of Figure 1.
Figure 5:
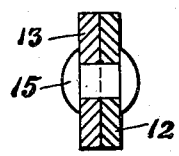
Figure 5 is a section on the line 5—5 of Figure 1.
Figure 3:
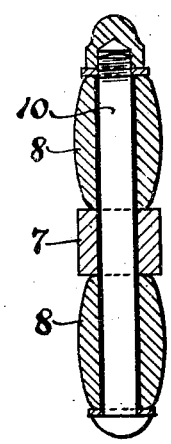
Figure 3 is a section on the line 3—3 of Figure 2.

Referring to the drawings in detail, 1 and 2 constitute the frame members on which are mounted the spring plates 3 by bolts 4 and padded clamps 5 in the usual manner. The outer ends of the spring supporting plates 3 are each turned forwardly as at 6 and formed into an eye 7. This eye is located between the eyes 8 of the upper and lower front bumper bars 9. A common bolt 10 extends through the three eyes to hold them together. Then the ends of the bumper bars 9 are spaced apart in a predetermined relationship.

The inner end of the spring plate 3 is struck downwardly as at 11 and then it proceeds in a horizontal plane as at 12 to form a flat engaging surface with the inner end 13 of the U-shaped support 14. The ends 12 and 13 are connected by a rivet 15. The U-shaped member 14 is twisted upwardly to the point where it engages with the front bumper bars 9 between them in conjunction with the clamp plate 16 and the bolt 17.

The U-shaped support 14 is likewise moved upwardly at 18 in order to assume at its outer end a position in a plane generally between the bumper bars 9. The curves 11 and 18 add to the resiliency of the bumper.

The forward end of the U-shaped member 14 is indicated at 19. In operation, any impact will distribute itself through the bumper bars 9 and thence to the spring plates 3; and also distribute itself through the bumper bars 9, U-shaped supporting spring plates 14 and the downwardly struck parts 11 of plates 3. The parts thus constructed are arranged so that the force of impact is so proportioned that each half will carry its own load thereby permitting the minimum thickness of metal to be employed as the load can be equally distributed and predetermined.

It will be understood that I desire to comprehend within my invention such modifications as may be clearly embraced within the scope of my claims and invention.

Having thus fully described my invention what I claim as new and desire to secure by Letters Patent, is:

1. In a bumper, supporting plates extending across the end of a vehicle, common bumper means connected to the outer ends of said supporting plates and independent supplementary bumper supports connected at points within the ends of the common bumper means to the first bumper means and to the inner ends of the supporting plates.

2. In a bumper, supporting plates extending across the end of a vehicle, common bumper means connected to the outer ends of said supporting plates and independent supplementary bumper supports connected at points within the ends of the common bumper means to the first bumper means and to the inner ends of the supporting plates, the connection between the supporting plates and the common bumper means first mentioned being a pivotal connection.

3. In a bumper, supporting plates extending across the end of a vehicle, common bumper means connected to the outer ends of said supporting plates and independent supplementary bumper supports connected at points within the ends of the common bumper means to the first bumper means and to the inner ends of the supporting plates, the connection between the supporting plates and the common bumper means being a pivotal connection and the connection between the inner connection between the supporting plates being a permanent connection.

4. In combination in a bumper, supporting frame members, a front bumper means, spaced spring plates pivotally connected at one end to the free ends of the bumper means and extending across the ends of the supporting frame members and supplementary bumper means located between the front bumper means and the spring plates and connected to the other ends of the spring plates between the frame members.

5. In combination in a bumper, supporting frame members, a front bumper means, spaced spring plates connected at one end to the free ends of the front bumper means and extending across the ends of the supporting frame members and supplementary bumper means located between the bumper means and the spring plates and connected to the outer ends of the spring plates between the frame members and connected to the bumper means at points substantially in line with the frame members.

6. In combination, front vehicle frame members, bumper means, rear spring supporting plates pivoted to the ends of the front bumper means and extending across the ends of the vehicle frame members to points within said vehicle frame members but spaced from each other, U-shaped supplementary bumper means connected to points within the ends of the bumper means and to the other ends of the spring plate.

7. In combination, a front bumper means, rear spring supporting plates extending across the ends of the vehicle frame members to points within said vehicle frame members but spaced from one another, U-shaped supplementary bumper means connected to points within the ends of the first mentioned bumper means and to the inner ends of the spring plate, the connection between the first mentioned bumper means and the spring plate comprising pivotal connections for relative movement.

8. In combination, frame members, spaced bumper bars, rear spring supporting plates connected between said bumper bars at one of their ends with an intermediate offset part of each of the spring plates extending across the ends of the frame members to points therebetween, their ends being spaced from one another, and intermediate bumper members between the spaced bumper bars and said spring plates connected at their inner ends to the inner ends of the spring plates.

9. In combination, spaced bumper bars, rear spring supporting plates connected between said bumper bars at their ends in an intermediate plane, said spring plates extending across the ends of the frame members to points therebetween, their ends being spaced from one another and intermediate bumper members between the front bumper bars and said spring plates connected at their inner ends to the inner ends of the spring plates, said point of connection being in a different plane than the connection of the spring plates between the bumper bars.

10. In combination, spaced bumper bars, rear spring supporting plates connected between said bumper bars at their ends in an intermediate plane of the spring plates extending across the ends of the frame members to points therebetween, their ends being spaced from one another and intermediate bumper members between the front bumper bars and said spring plates connected at their inner ends to the inner ends of the spring plates, said point of connection being in a different plane than the connection of the spring plates between the bumper bars and said intermediate bumper means being connected to the first mentioned bumper bars substantially between them.

11. In combination, spaced bumper bars, rear spring supporting plates connected between said bumper bars at their ends in an intermediate plane of the spring plates extending across the ends of the frame members to points therebetween, their ends being spaced from one another and intermediate bumper members between the front bumper bars and said spring plates connected at their inner ends to the inner ends of the spring plates, said point of connection being in a different plane than the connection of the spring plates between the bumper bars and said intermediate bumper means being connected to the first mentioned bumper bars substantially between them at points within their ends.

12. In combination, a front bumper means extending across a vehicle beyond the frame ends of the vehicle, rearwardly disposed spring supporting plates mounted on the vehicle frame ends and extending across said ends to points within the frame members, means for pivotally connecting the bumper means and the spring plates at their outer ends and concentric spaced U-shaped inner bumper means connected to the first mentioned bumper means at points within its ends and to the spring plates at their inner ends between the frame members.

13. In combination, a front bumper means extending across a vehicle beyond the frame ends of the vehicle, rearwardly disposed spring supporting plates mounted on the vehicle frame ends and extending across said ends to points within the frame members, means for pivotally connecting the bumper means and the spring plates at their outer ends and concentric spaced U-shaped inner bumper means connected to the first mentioned bumper means at a point within its ends and to the spring plates at their inner ends between the frame members said points of connection of the second bumper means being in different planes.

14. In combination, a front bumper means extending across a vehicle beyond the frame ends of the vehicle, rearwardly disposed spring supporting plates mounted on the vehicle frame ends and extending across said ends to points within the frame members, means for pivotally connecting the bumper means and the spring plates at their outer ends and concentric spaced U-shaped inner bumper means connected to the first mentioned bumper means at points within its ends and to the spring plates at their inner ends between the frame members said points of connection of the second bumper means being in different planes at least one of which is in the same plane at the connection of the spring plates with the front bumper means.

15. In combination, spaced bumper bars connected at their outer ends, supporting plates connected pivotally to said outer ends therebetween, the inner ends of said supporting plates being in different horizontal planes from their outer ends and extending within the frame members on which they are mounted and intermediate spring members connected to said inner ends and to said bumper bars within their ends.

16. In combination, spaced bumper bars connected at their outer ends, supporting plates connected pivotally to said outer ends therebetween, the inner ends of said supporting plates being in different horizontal planes from their outer ends and extending within the frame members on which they are mounted and intermediate spring members connected to said inner ends and to said bumper bars within their ends, said connection with the bumper bars comprising clamping plates spacing said bumper bars in a predetermined relationship in different horizontal planes.

17. In a bumper, a bumper means, means supporting the bumper means on the frame members of a vehicle and concentric bumper means within the first mentioned bumper means located adjacent the ends thereof and connected to the inner ends of the supporting means within the frame members.

18. In combination, a front bumper extending across the vehicle beyond the frame ends thereof, spring supporting means shorter than the first mentioned bumper extending from the ends thereof inwardly to points within the frame members and mounted upon said frame members thereby forming U-shaped ends of the bumper, and concentrically located supplementary bumper means located therebetween connected respectively to the bumper within its ends and to the spring supporting means at its inner ends between the frame members.

In testimony whereof, I affix my signature.

EDWARD H. McCLOUD.